Feb. 18, 1947.　　　C. R. GRUBER　　　2,415,876
HAND TRUCK
Filed May 12, 1945　　　2 Sheets-Sheet 2
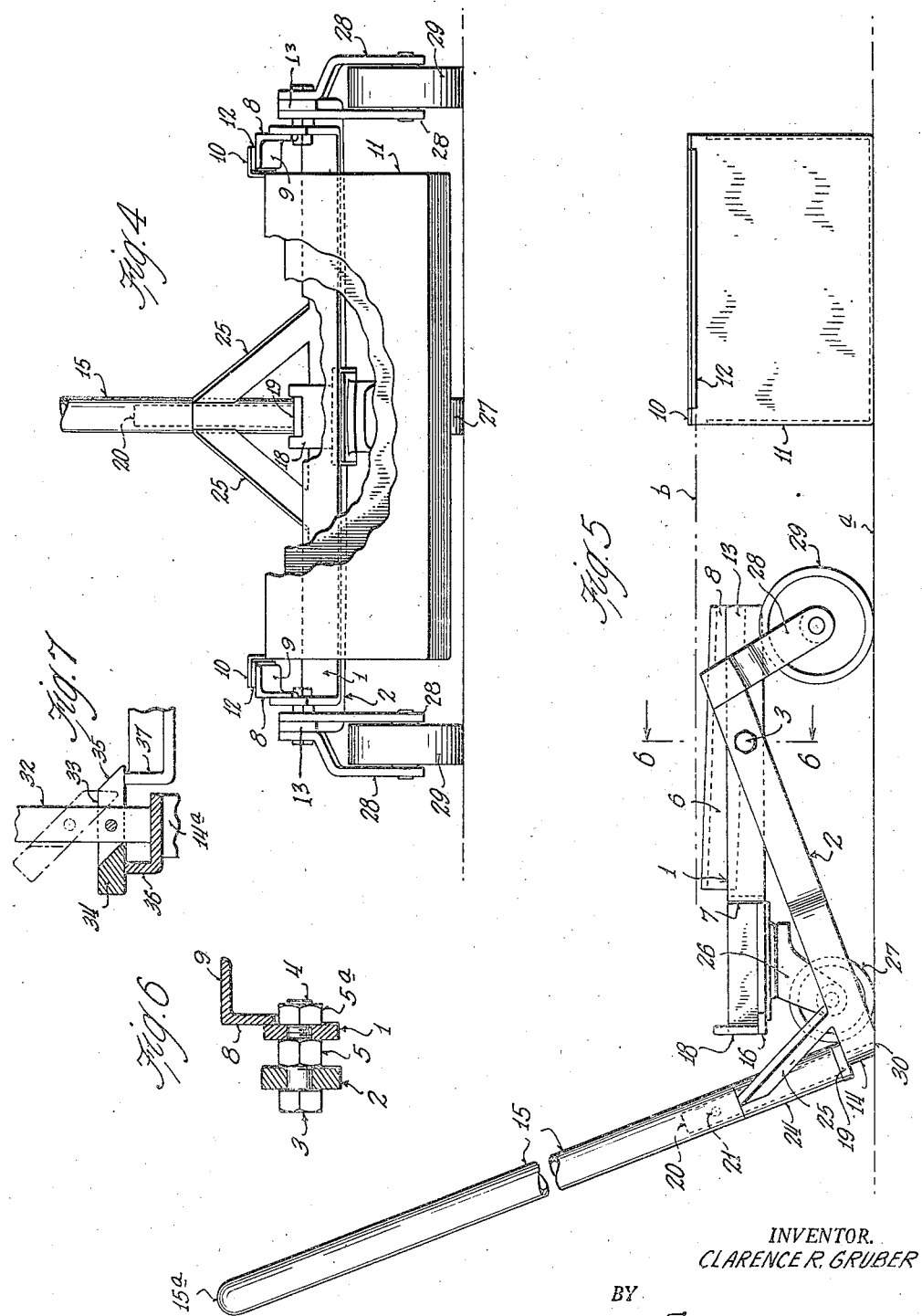
INVENTOR.
CLARENCE R. GRUBER
BY
ATTORNEY.

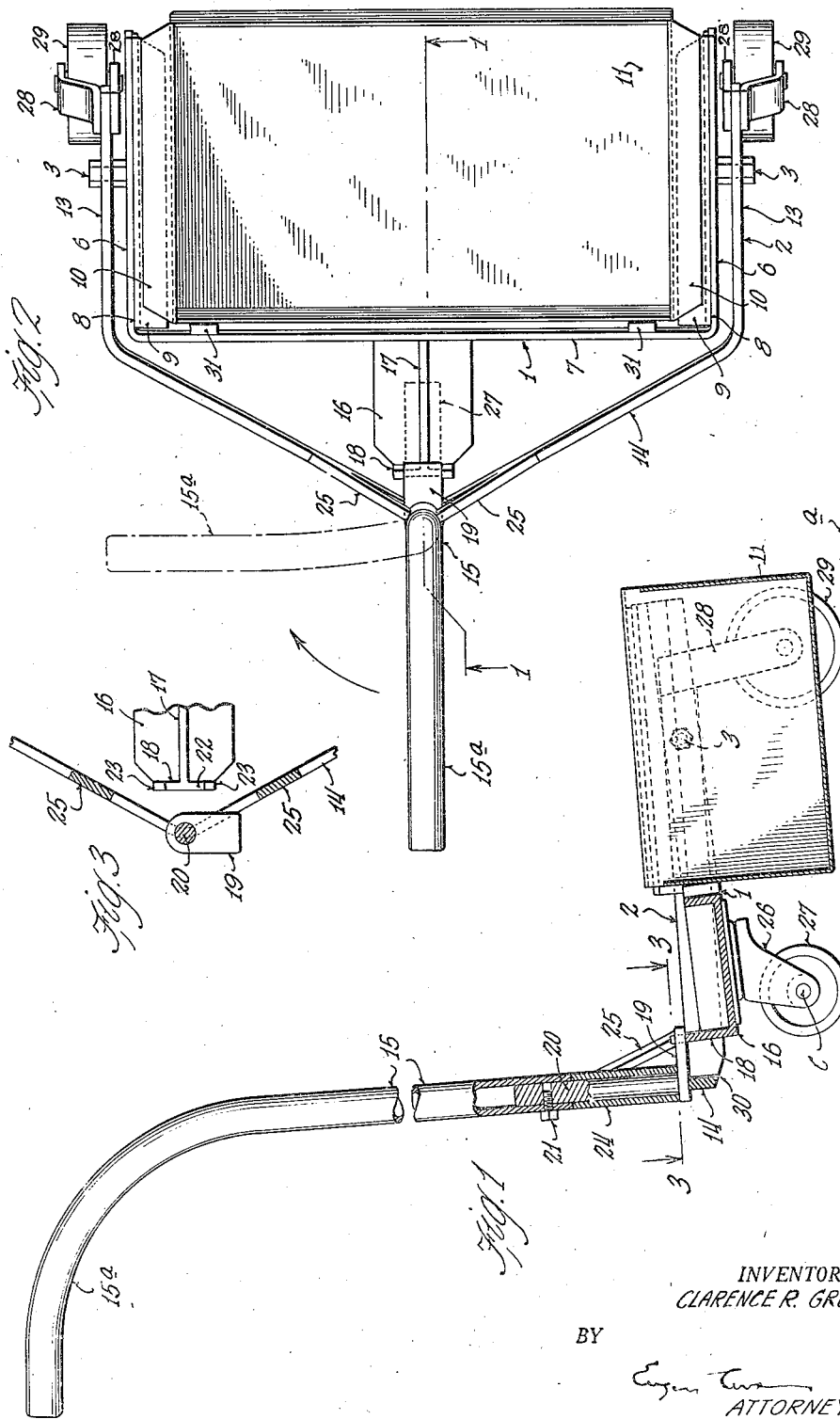
Feb. 18, 1947. C. R. GRUBER 2,415,876
HAND TRUCK
Filed May 12, 1945 2 Sheets-Sheet 1
INVENTOR.
CLARENCE R. GRUBER
BY
ATTORNEY.

Patented Feb. 18, 1947

2,415,876

UNITED STATES PATENT OFFICE 2,415,876

HAND TRUCK

Clarence R. Gruber, Milwaukee, Wis.

Application May 12, 1945, Serial No. 593,374

12 Claims. (Cl. 280—46)

This invention relates to improvements in wheel or roller supported hand trucks or dollies for readily lifting and transporting loads.

The principal object and purpose of my invention is to provide a hand truck comprised of a load engaging member and an actuating member pivotally connected together on an axis between the front and the rear wheels of the truck and forwardly of its transverse center line whereby the load will be raised and lowered by said members in the relatively pivotal movement between them.

A further object of my invention is to provide said members in the form of inner and outer frames open at the front end of the truck to straddle or span the load to be handled thereby and to enable the truck to be moved into and out of operative position with the load.

A further object of my invention is to provide the truck with locking means for locking said frames or members in their load lifting positions so that the truck may transport the lifted load.

A further object of my invention is to actuate the locking means into release position from or through the handle member with which the truck is provided for moving or pushing the truck about or from place to place.

A further object of my invention is to connect the handle member with the actuating member of the truck for actuating it and for moving the truck about on its wheel or roller support.

The invention consists further in the structural features and combination of parts hereinafter described and claimed.

In the accompanying drawings—

Fig. 1 is a vertical sectional view with parts in elevation of my improved hand truck taken on line 1—1 of Fig. 2, the truck being shown lifting a load to be transported thereby;

Fig. 2 is a top plan view of the parts shown in Fig. 1, the handle member of the truck being shown in broken lines turned to latch or locking member release position;

Fig. 3 is a sectional view of a detail of construction taken on line 3—3 of Fig. 1, the locking member being shown in its release position;

Fig. 4 is a front view of the truck with its lifted load as depicted in Fig. 1, the load being partly broken away to show the truck structure therebehind;

Fig. 5 is a side elevational view of the truck and the load in separated relation, the truck being disposed to be moved into spanning position with respect to the load preparatory to lifting and transporting the same;

Fig. 6 is a sectional view of a detail of construction taken on line 6—6 of Fig. 5; and Fig. 7 is a vertical sectional view of a modified form of locking construction to be hereinafter described.

As shown in the drawings, the improved hand truck or dollie of my invention comprises a load engaging member 1 and an actuating member 2, said members being in the form of inner and outer frames open at the front end of the truck to straddle or span the load to be handled thereby. Said members or frames 1, 2 are pivotally connected together on an axis 3 between the front and rear supporting wheels of the truck and forwardly of its transverse center line whereby the load will be raised and lowered by said frames in the relatively pivotal movement between them. The axis 3 is comprised of a pair of pivot bolts 4, 4 at the opposite sides of the frames, each bolt being fixed in position by clamping nuts 5, 5a as detailed in Fig. 6. As there shown, the nuts 5 serve to space the frames 1, 2 apart for freedom in pivotal movement.

The inner frame 1 comprises substantially parallel side members 6, 6 and a connecting cross-member 7 at the rear of the frame. Spot welded or otherwise rigidly secured to the inner sides of the side members 6 are angle sections 8, 8 having their inwardly extending horizontal flanges 9 to enter beneath the flanges 10, 10 or similar supports provided on the load 11 to be handled and transported by the truck. In the particular embodiment shown, the load 11 comprises a container of the metal type to carry machined and other parts as used in machine shops and factories. Metal strips 12 are secured to the undersides of the flanges 10 to accommodate the container 11 to the lifting action of the truck.

The outer frame 2 is also made of rigid metal stock similar to that employed for the inner frame 1 and comprises side members 13, 13 substantially parallel to each other and to the side members 6 of the inner frame as indicated in Fig. 2. The side members 13 are connected at the rear of the outer frame by a cross-bar 14 angular in form as shown in Fig. 2. This shape provides said cross-bar 14 with half sections diverging from the center of the bar towards the side members 13.

The center or apex section of the bar 14 is located in the fore and aft center line of the truck and the handle member 15 secured to the bar 14 at said center section is positioned at the best possible place for use in raising and lowering the outer frame about the axis 3 and for pushing or moving the truck about on its front and rear wheels or rollers to be later described. The handle member 15 extends upwardly from the cross-bar 14 and terminates in a rearwardly curved section 15a at the proper height to be readily and easily grasped by the hand of the operator manipulating the truck.

Rigidly secured to the rear member 7 of the inner frame 1 as by welding or otherwise is a rearwardly extending, rigid bracket 16 having a central strengthening web 17. Said bracket 16 may be a metal casting and has an upstanding rear portion 18 adapted to be engaged by the free or locking end of a locking or latch member 19 fixed to the lower end of a turntable shaft section 20 to which the handle member 15 is connected by a clamping or set screw 21 as shown in Fig. 1. The upper end of the bracket section 18 is recessed at 22 to provide a seat for the latch member 19 and has side lugs 23 to keep the latch member 19 in its locking position as shown in Figs. 1 to 3. When lifted clear of the lugs 23 by the handle member 15, the locking member 19 can be turned to release position and the rear end of the outer frame 2 can then be moved downwardly about the pivotal axis 3. This movement of the outer frame 2 lowers the load or container 11 onto the floor $a$ and the truck may be thereupon backed away from the container, the level of the flanges 10 being above the truck frame 1 as indicated by the broken line $b$ in Fig. 5.

The broken lines in Fig. 2 show the position to which the upper angular end 15a of the handle 15 is moved to release the locking member 19 from the casting 16. The member 19 is shown in full lines in its release position in Fig. 3 and it will be noted that the rear bar 14 of the outer frame is rearward of the bracket 16 so that said bar 14 clears the bracket in its swinging movement.

The tube section 24 which mounts the shaft 20 is secured to the cross-bar 14 by a pair of side braces 25, 25 rigidly secured to the parts by welding or otherwise. The tube section 24 is open at its opposite ends for the shaft section to extend above it to receive the handle member 15 and to have the latch member 19 secured to its lower end. The latch member 19 contacts the cross-bar 14 below it to hold the latch member and the shaft in place.

Bolted or otherwise rigidly secured to the underside of the bracket 16 is a caster wheel fixture 26 having a caster wheel or roller 27 which wheel constitutes the rear supporting wheel of the truck. The fixture 26 provides a mounting for the rear wheel 27 on a vertical axis for guiding the truck in its mobile function.

Rigidly secured to the outer ends of the side members 13 of the outer frame 2 are bracket arms 28, 28, one on each side member 13, and in fixed transverse relation thereto as shown in Figs. 1 and 5. The front wheels 29 of the truck are journalled in the bracket arms 28 for contact with the floor $a$ over which the truck is moved.

In the use of the truck or dollie, the device is conditioned as shown in Fig. 5 for lifting a load. The latch member 19 is turned to release position and the rear end of the frame 2 is dropped down to the floor about the axis 3 as shown in Fig. 5. The underside of the frame 2 at the apex in the cross-bar 14 is beveled off as at 30 to give the outer frame its greatest angle to the inner frame when lowered as shown. In the downward tilting movement of the rear end of the outer frame 2, the wheels 29 at the front end of the frame are moved forwardly of the positions shown in Fig. 1 and the inner frame 1 pivots downwardly about the axis $c$ of its rear wheel 27. This lowers the axis 3 and consequently both frames are moved below the level $b$ of the flanges 10 and deposits the load or container 11 onto the floor $a$. This raising and lowering action is the component of the pivotal movement between the frames and varying the distance between the supporting wheels.

The extent of vertical movement given to the axis 3 in the raising and lowering action aforesaid is from the position shown in Fig. 1 to the position shown in Fig. 5. The action of the bracket arms 28 is between the somewhat upright positions shown in Fig. 1 and the forwardly inclined positions shown in Fig. 5. This movement is sufficient to lift the load 11 clear of the floor $b$ as indicated in Fig. 1.

When the truck is positioned spanning the load preparatory to lifting it the outer frame 2 is raised by the handle member 15 about the axis 3 and the front wheels 29 are returned to their positions shown in Fig. 1 lifting the container from the floor $a$ allowing the truck to transport the load or container and its contents. The inner frame 1 takes a slight inclination backwardly and the container or load 11 rests in such position against stops 31, 31 on the rear bar 7 of the inner frame 1 as depicted in Fig. 2. Hence, the container 11 is prevented from accidentally sliding out of the truck when carried about.

A modified form of lock construction is shown in Fig. 7. Here, the cross-bar 14a of the actuating member or outer frame 2 is fixedly secured to the handle member 32 of the truck and pivotally mounts a latch member or gravity acting pawl 33 having its rear portion weighted as indicated at 34 and its outer end beveled as shown at 35. The cross-bar 14a has a stop 36 to support the pawl 33 in its horizontal locking position as shown on Fig. 7. The outer or forward end of the pawl 33 engages a rigid fixture 37 secured to the inner frame 1 as the equivalent of the bracket 16 before described. In use of the locking arrangement shown in Fig. 7 the operator raises the handle member 32 to lift the pawl 33 above the bracket 37 sufficient for the pawl to pivot to free the bracket and thereupon the outer frame 2 is lowered to lower the load supported by the truck or to condition the truck to pick up another load as hereinbefore described. On lifting upwardly on the handle 32 to raise the outer frame, the pawl 32 ratchets over the fixture 37 and assumes locking position as shown.

The hand truck shown and described is simple and inexpensive in construction. It overcomes the heretofore manual method of dragging containers 11 and their loads over the floor to move them from place to place. The truck device not only facilitates the more convenient and rapid transportation of "tote boxes" and other loads but insures easy lifting and lowering of such loads with a minimum of movement and less effort and strain on the workman or operator.

The details of construction and arrangement of parts shown and described may be variously changed and modified without departing from the spirit and scope of my invention, except as pointed out in the annexed claims.

I claim as my invention:

1. A hand truck of the character described comprising, inner and outer frames open at the front end of the truck to span a load to be handled thereby, front and rear supporting wheels for the truck, the rear wheel being secured to the inner frame and the front wheels being secured to the outer frame, and means pivotally connecting the frames together on an axis between said front and rear wheels and forwardly of the transverse center line of the truck, whereby the load will be raised and lowered by the frames in the relative pivotal movement between them.

2. A hand truck of the character described comprising, inner and outer frames open at the front end of the truck to span a load to be handled thereby, front and rear supporting wheels for the truck, the rear wheel being secured to the inner frame and the front wheels being secured to the outer frame, means pivotally connecting the frames together on an axis between said front and rear wheels and forwardly of the transverse center line of the truck, whereby the load will be raised and lowered by the frames in the relative pivotal movement between them, and means locking the frames together in their load lifting positions.

3. A hand truck of the character described comprising, inner and outer frames open at the front end of the truck to span a load to be handled thereby, front and rear supporting wheels for the truck, the rear wheel being secured to the inner frame and the front wheels being secured to the outer frame, means pivotally connecting the two frames together on an axis between said front and rear wheels and forwardly of the transverse center line of the truck, whereby the load will be raised and lowered by the frames in the relative pivotal movement between them, means for locking the frames together in their load lifting positions, and a handle for the truck secured to one of said frames.

4. A hand truck of the character described comprising, inner and outer frames open at the front of the truck to span a load to be handled thereby, front and rear supporting wheels for the truck, the rear wheel being secured to the inner frame and the front wheels being secured to the outer frame, means pivotally connecting the frames together on an axis between said front and rear wheels and forwardly of the transverse center line of the truck, whereby the load will be raised and lowered by the frames in the relative pivotal movement between them, a latch member for locking the frames together in their load lifting positions, and a handle for the truck connected with said latch member for actuating it.

5. A hand truck of the character described comprising, inner and outer frames open at the front end of the truck to span a load to be handled thereby, front and rear supporting wheels for the truck, the rear wheel being secured to the inner frame and the front wheels being secured to the outer frame, means pivotally connecting the frames together on an axis between said front and rear wheels and forwardly of the transverse center line of the truck, whereby the load will be raised and lowered by the frames in the relative pivotal movement between them, a bearing element carried by the outer frame, a shaft section journalled therein, a latch member secured to one end of said shaft to lock the frames together in their load lifting positions, and a handle member for the truck connected with the other end of the shaft to turn the same.

6. A hand truck of the character described comprising, inner and outer frames open at the front end of the truck to span a load to be handled thereby, front and rear supporting wheels for the truck, the rear wheel being secured to the inner frame and the front wheels being secured to the outer frame, means pivotally connecting said frames together on an axis between said front and rear wheels and forwardly of the transverse center line of the truck, whereby the load will be raised and lowered by the frames in the relative pivotal movement between them, a tubular member secured to the outer frame, a shaft journalled therein, a latch member secured to the lower end of said shaft and turnable into engagement with the inner frame to lock the frames together in their load lifting positions, and a handle for the truck and connected to said shaft for turning the same.

7. A hand truck of the character described comprising, inner and outer frames open at the front end of the truck to span a load to be handled thereby, front and rear supporting wheels for the truck, the rear wheel being secured to the inner frame and the front wheel being secured to the outer frame, means pivotally connecting the frames together on an axis between the front and rear wheels and forwardly of the transverse center line of the truck, whereby a load will be lifted by the frames in the relative pivotal movement between them, a bracket being secured to the inner frame, and latch and handle members carried by the outer frame, the latch member being movable by the handle into locking engagement with said bracket to lock the frames together in their load lifting positions.

8. A hand truck of the character described comprising, a load engaging member and an actuating member, said members being open at the front of the truck to span a load to be handled thereby, front and rear supporting wheels for the truck, the rear wheel being secured to the load engaging member and the front wheels being secured to the actuating member, and means pivotally connecting said members together on an axis between said front and rear wheels and located forwardly of the transverse center line of the truck, whereby the front wheels in the pivotal movement of the actuating member will raise and lower the load engaging member about the axis of its rear wheel.

9. A hand truck of the character described comprising, a load engaging member and an actuating member, said members being open at the front of the truck to span a load to be handled thereby and having substantially parallel side portions at the sides of the truck, front and rear supporting wheels for the truck, the rear wheel being secured to the load engaging member and the front wheels being secured to the actuating member at the side portions thereof, means pivotally connecting the members together on an axis between the front and rear wheels and located forwardly of the transverse center line of the truck, whereby the front wheels in the pivotal movement of the actuating member will raise and lower the load engaging member about the axis of its rear wheel, and means for locking the members in their load lifting positions.

10. A hand truck of the character described comprising, a load engaging element and an actuating element, each element being open at the front end of the truck to span a load to be handled thereby and having substantially parallel side members at the sides of the truck, front and rear supporting wheels for the truck, the rear wheel being secured to the load engaging element and the front wheels being secured to the actuating element at the front ends of the side members thereof, and means pivotally connecting the elements together at the side members on an axis between the front and rear wheels and forwardly of the transverse center line of the truck, whereby the front wheels in the pivotal movement of the actuating member will raise and lower the load engaging member about the axis of its rear wheel.

11. A hand truck of the character described comprising, a load engaging member and an actuating member, the latter having side portions at the sides of the truck, front and rear supporting wheels for the truck, bracket arms fixedly secured to said side members at the front of the truck and extending downwardly in angular relation thereto, the rear wheel being secured to the load engaging member and the front wheels mounted on said arms, and means pivotally connecting said members together between said front and rear wheels and in a manner whereby the load will be raised and lowered by the truck in the relative pivotal movement of the two members and varying the distance between said front and rear wheels.

12. A hand truck of the character described comprising, inner and outer frames open at the front end of the truck to span a load to be handled thereby, front and rear supporting wheels for the truck, the rear wheel being secured to the inner frame and the front wheels being secured to the outer frame, means pivotally connecting the frames together in a manner whereby the load will be raised and lowered by the truck in the relative pivotal movement of the two frames, a handle member for the truck connected to the outer frame, and a latch member pivoted to the handle member and ratcheting into locking position in the pivotal movement of the outer frame with respect to the inner frame.

CLARENCE R. GRUBER.

REFERENCES CITED

The following references are of record in the file of this patent:

UNITED STATES PATENTS

| Number | Name | Date |
|---|---|---|
| 1,533,987 | Germond, Jr. | Apr. 14, 1925 |
| 1,547,770 | Maddox | July 28, 1925 |